(12) United States Patent
Sakamaki et al.

(10) Patent No.: US 10,272,941 B2
(45) Date of Patent: Apr. 30, 2019

(54) VEHICLE STEERING DEVICE

(71) Applicant: JTEKT CORPORATION, Osaka-shi, Osaka (JP)

(72) Inventors: Masahiko Sakamaki, Yao (JP); Keisuke Izutani, Yamatotakada (JP)

(73) Assignee: JTEKT CORPORATION, Osaka (JP)

( * ) Notice: Subject to any disclaimer, the term of this patent is extended or adjusted under 35 U.S.C. 154(b) by 96 days.

(21) Appl. No.: 15/334,443

(22) Filed: Oct. 26, 2016

(65) Prior Publication Data
US 2017/0120949 A1    May 4, 2017

(30) Foreign Application Priority Data

Nov. 2, 2015 (JP) .................................. 2015-215942

(51) Int. Cl.
*B62D 5/04* (2006.01)
*B62D 5/00* (2006.01)
*B62D 6/00* (2006.01)

(52) U.S. Cl.
CPC ........... *B62D 5/0469* (2013.01); *B62D 5/005* (2013.01); *B62D 5/006* (2013.01); *B62D 5/0412* (2013.01); *B62D 5/0424* (2013.01); *B62D 6/003* (2013.01); *B62D 6/008* (2013.01)

(58) Field of Classification Search
CPC ...... B62D 2/005; B62D 5/006; B62D 5/0412; B62D 5/0424; B62D 5/0469; B62D 6/003; B62D 6/008
USPC ....................................................... 180/402
See application file for complete search history.

(56) References Cited

U.S. PATENT DOCUMENTS 7,308,964 B2 * 12/2007 Hara ................... B62D 1/163
                                                                180/402
2006/0200290 A1     9/2006 Chino et al.

FOREIGN PATENT DOCUMENTS

EP        1407959 A2    4/2004
JP      2006-240399 A    9/2006

OTHER PUBLICATIONS

Nov. 7, 2017 Extended Search Report issued in European Patent Application No. 16196309.5.

* cited by examiner

*Primary Examiner* — Anne Marie M Boehler
*Assistant Examiner* — Felicia L. Brittman
(74) *Attorney, Agent, or Firm* — Oliff PLC

(57) ABSTRACT

A vehicle steering device, in which a steering member and a steering operation mechanism are not mechanically coupled, includes a reaction force motor that applies a reaction force to the steering member, and a reaction force motor control unit that controls the reaction force motor. The reaction force motor control unit includes a target rotational angle setter that sets a target rotational angle for an output shaft at a position close to the side of the neutral position of the output shaft with respect to the rotational angle of the output shaft corresponding to a steered angle limit value by a rotational angle matching steering torque detected by a torque sensor when a steered angle has reached the steered angle limit value and the steering torque that is larger than the steering torque at the time when the steered angle limit value was reached is applied to a steering wheel.

3 Claims, 6 Drawing Sheets

VEHICLE STEERING DEVICE

INCORPORATION BY REFERENCE

The disclosure of Japanese Patent Application No. 2015-215942 filed on Nov. 2, 2015 including the specification, drawings and abstract, is incorporated herein by reference in its entirety.

BACKGROUND OF THE INVENTION

1. Field of the Invention

The present invention relates to a vehicle steering device in which a steering operation mechanism is driven by a steering motor with a steering member to be operated for steering operation and the steering operation mechanism are not mechanically coupled to each other.

2. Description of Related Art

There is proposed a steer-by-wire system in which the drive force of a steering motor to be controlled in accordance with an operation of a steering wheel that serves as a steering member is transferred to a steering operation mechanism with the steering wheel and the steering operation mechanism not mechanically coupled to each other. Such a steer-by-wire system includes a reaction force motor that applies a reaction force to the steering wheel. An input shaft is coupled to the steering wheel. An output shaft is coupled to the reaction force motor. The input shaft and the output shaft are coupled to each other by a torsion bar so as to be relatively rotatable. See Japanese Patent Application Publication No. 2006-240399 (JP 2006-240399 A), for example.

In the steer-by-wire system discussed earlier, it is conceivable to set a target rotational angle which is a target value for the rotational angle of the output shaft, and to control the reaction force motor such that the rotational angle of the output shaft is equal to the target rotational angle. It is also conceivable to control the reaction force motor such that the steering wheel is not rotated any further, by temporarily fixing the target rotational angle for the output shaft, when the steered angle of steered wheels has reached a steered angle limit value. Even if the target rotational angle for the output shaft is temporarily fixed, however, the torsion bar may be twisted by steering torque to rotate the steering wheel.

SUMMARY OF THE INVENTION

An object of the present invention is to provide a vehicle steering device that suppresses rotation of a steering member when the steered angle of steered wheels has reached a steered angle limit value.

An aspect of the present invention provides a vehicle steering device in which a steering operation mechanism that steers steered wheels is driven by a steering motor with a steering member to be operated for steering operation and the steering operation mechanism not mechanically coupled to each other.

The vehicle steering device includes:

an input shaft coupled to the steering member;

a torsion bar, one end of which is coupled to the input shaft;

an output shaft coupled to the other end of the torsion bar;

a reaction force motor coupled to the output shaft to apply a reaction force to the steering member;

a torque detector that detects steering torque applied to the steering member; and a reaction force motor controller that sets a target rotational angle for the output shaft and that controls the reaction force motor such that a rotational angle of the output shaft is equal to the target rotational angle.

The reaction force motor controller includes a target rotational angle setter that sets the target rotational angle for the output shaft at a position close to a side of a neutral position of the output shaft with respect to the rotational angle of the output shaft corresponding to a steered angle limit value by a rotational angle matching the steering torque which is detected by the torque detector when a steered angle of the steered wheels has reached the steered angle limit value and the steering torque that is larger than the steering torque at a time when the steered angle limit value was reached is applied to the steering member.

When steering torque that is larger than steering torque at the time when the steered angle limit value was reached is applied to the steering member after the steered angle has reached the steered angle limit value, the steering member is urged to be rotated with respect to the output shaft in the direction opposite to the side of the neutral position of the output shaft by an amount corresponding to the torsional angle of the torsion bar matching the steering torque. In the vehicle steering device according to the aspect, the target rotational angle for the output shaft is set at a position close to the side of the neutral position of the output shaft with respect to the rotational angle of the output shaft corresponding to the steered angle limit value by the rotational angle matching the steering torque. Consequently, the output shaft is urged to be rotated to a position close to the side of the neutral position of the output shaft by the rotational angle matching the steering torque. As a result, rotation of the steering member can be suppressed.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described in detail below with reference to the accompanying drawings.

Figure 1:
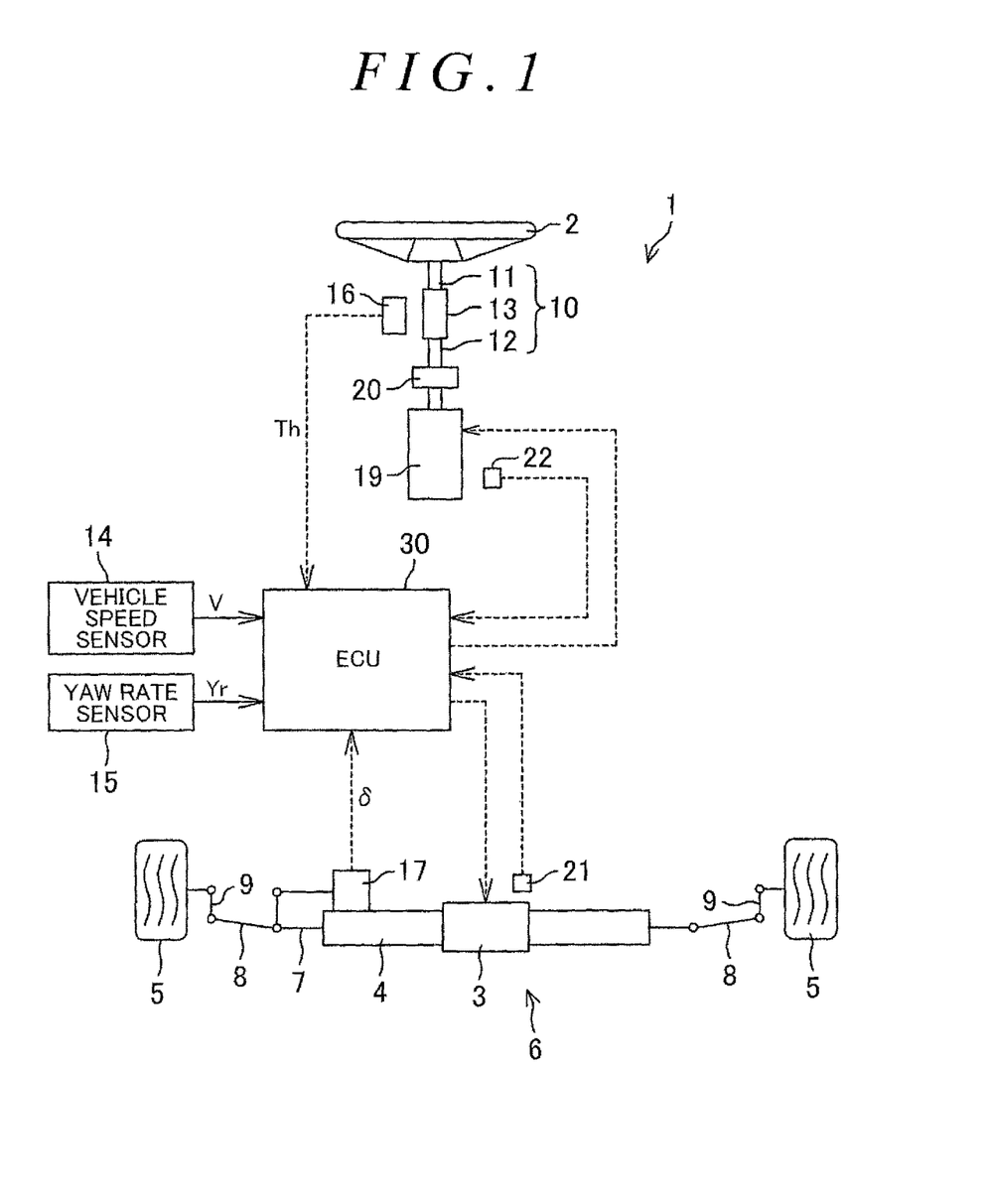
FIG. 1 illustrates the configuration of a vehicle steering device according to an embodiment of the present invention.

FIG. 1 illustrates the configuration of a vehicle steering device according to an embodiment of the present invention, illustrating the configuration of a steer-by-wire system.

A vehicle steering device 1 includes a steering wheel 2 that serves as a steering member to be operated by a driver for steering operation, a steering motor 3 to be driven in accordance with an operation to rotate the steering wheel 2, and a steering gear 4 that transfers the drive force of the steering motor 3 to steered wheels 5. The steering wheel 2 and a steering operation mechanism 6, which includes the steering motor 3 etc., are not mechanically coupled to each other so that operation torque applied to the steering wheel 2 is not mechanically transferred to the steering operation mechanism 6. The steered wheels 5 are steered by controlling drive of the steering motor 3 in accordance with the amount of operation (steering angle or steering torque) of the steering wheel 2.

The steering motor 3 is constituted of an electric motor such as a brushless motor. In the embodiment, the steering motor 3 is constituted of a brushless motor. The steering motor 3 is provided with a rotational angle sensor 21, such as a resolver, that detects the rotational angle of a rotor of the steering motor 3.

The steering gear 4 has a motion conversion mechanism that converts rotational motion of an output shaft of the steering motor 3 into linear motion of a steering rod 7 (linear motion in the right-left direction of the vehicle). The motion of the steering rod 7 is transferred to the steered wheels 5 via tie rods 8 and knuckle arms 9 to vary the steered angle of the steered wheels 5. That is, the steering operation mechanism 6 is composed of the steering motor 3, the steering gear 4, the steering rod 7, the tie rods 8, and the knuckle arms 9. The steering gear 4 may be one of those known in the art. The configuration of the steering gear 4 is not limited as long as the motion of the steering motor 3 can be transferred to the steered wheels 5 so as to vary the steered angle.

In the embodiment, the steered angle of the steered wheels 5 is varied in the direction (right steering direction) in which the vehicle is steered to the right when the steering motor 3 is rotated in the forward direction, and the steered angle of the steered wheels 5 is varied in the direction (left steering direction) in which the vehicle is steered to the left when the steering motor 3 is rotated in the reverse direction.

The steering wheel 2 is coupled to a rotary shaft 10 rotatably supported on the vehicle body side. The rotary shaft 10 is provided with a reaction force motor 19 that generates reaction force torque (operation reaction force) that acts on the steering wheel 2.

The rotary shaft 10 includes an input shaft 11 coupled to the steering wheel 2, an output shaft 12 coupled to the reaction force motor 19 via a speed reducer 20, and a torsion bar 13 that couples the input shaft 11 and the output shaft 12 to each other. The reaction force motor 19 is constituted of an electric motor such as a brushless motor. In the embodiment, the reaction force motor 19 is constituted of a brushless motor. The reaction force motor 19 is provided with a rotational angle sensor 22, such as a resolver, that detects the rotational angle (rotor angle) of a rotor of the reaction force motor 19.

A torque sensor 16 that detects steering torque Th applied to the steering wheel 2 by the driver is provided around the rotary shaft 10. In the embodiment, the steering torque Th which is detected by the torque sensor 16 is detected as a positive value when the vehicle is steered to the right, and as a negative value when the vehicle is to be steered to the left, and the magnitude of the steering torque Th is larger as the absolute value of the positive or negative value is larger.

A steered angle sensor 17 that detects a steered angle δ of the steered wheels 5 is provided in the vicinity of the steering gear 4. The steered angle sensor 17 is constituted of a potentiometer that detects the amount of operation of the steering rod 7 corresponding to the steered angle δ, for example.

The vehicle is further provided with a vehicle speed sensor 14 that detects a vehicle speed V, a yaw rate sensor 15 that detects a yaw rate Yr, and so forth.

The torque sensor 16, the steered angle sensor 17, the vehicle speed sensor 14, the yaw rate sensor 15, and the rotational angle sensors 21 and 22 are each connected to an electronic control unit (ECU) 30. The ECU 30 controls the steering motor 3 and the reaction force motor 19.

Figure 2:
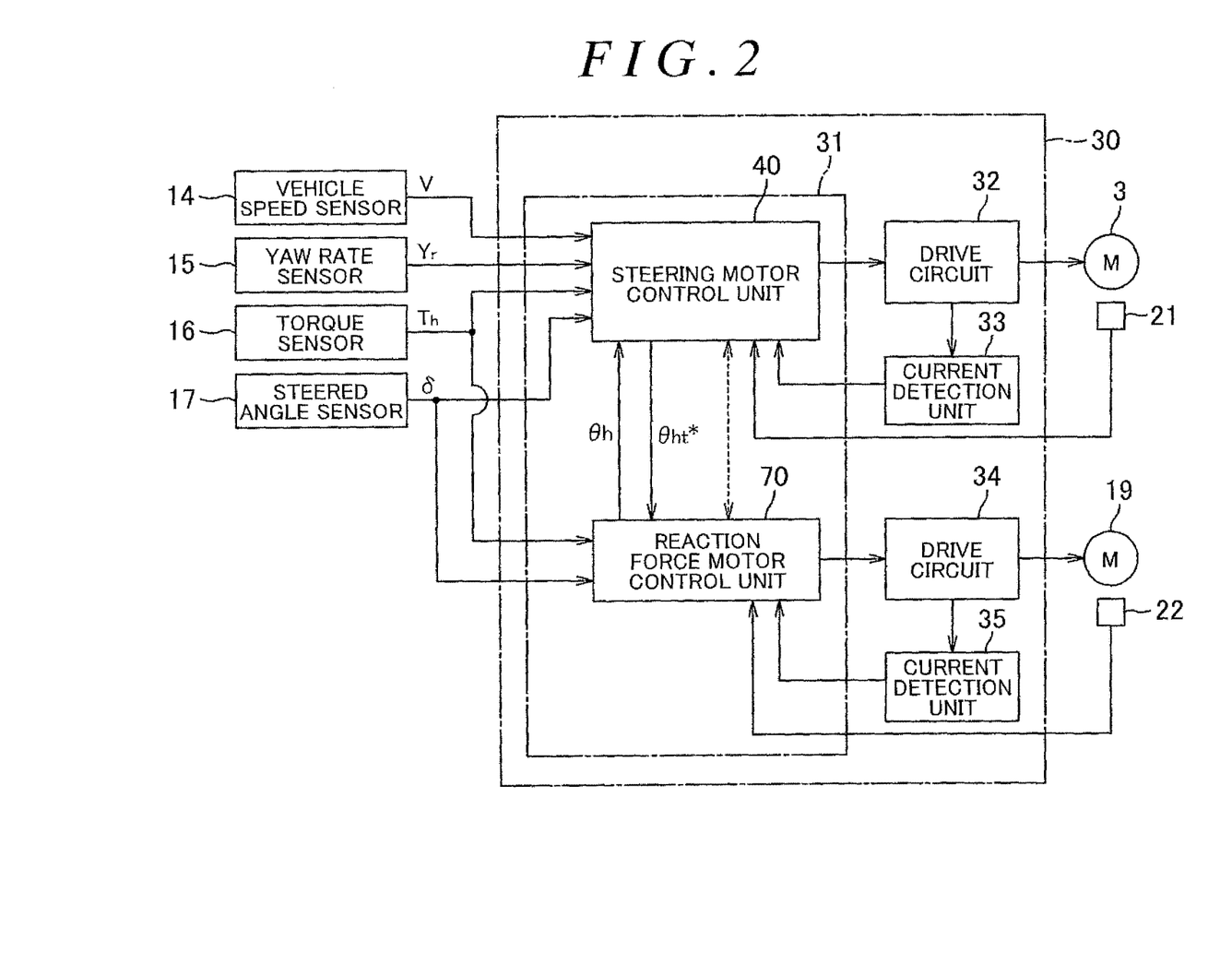
FIG. 2 is a block diagram illustrating the electric configuration of an ECU.

FIG. 2 is a block diagram illustrating the electric configuration of the ECU 30.

The ECU 30 includes a microcomputer 31, a drive circuit (inverter circuit) 32 that is controlled by the microcomputer 31 and that supplies electric power to the steering motor 3, a current detection unit 33 that detects a motor current that flows through the steering motor 3, a drive circuit (inverter circuit) 34 that is controlled by the microcomputer 31 and that supplies electric power to the reaction force motor 19, and a current detection unit 35 that detects a motor current that flows through the reaction force motor 19.

The microcomputer 31 includes a CPU and a memory (such as a ROM, a RAM, and a non-volatile memory), and executes a predetermined program to function as a plurality of function processing units. The plurality of function processing units include a steering motor control unit 40 that controls the steering motor 3 and a reaction force motor control unit 70 that controls the reaction force motor 19.

The steering motor control unit 40 controls the drive circuit 32 on the basis of: an output shaft angle θh provided from the reaction force motor control unit 70; the vehicle speed V which is detected by the vehicle speed sensor 14; the steering torque Th which is detected by the torque sensor 16; the yaw rate Yr which is detected by the yaw rate sensor 15; the steered angle δ which is detected by the steered angle sensor 17; an output signal from the rotational angle sensor 21; and a current detected by the current detection unit 33. The output shaft angle θh is the rotational angle of the output shaft 12. Consequently, the steering motor control unit 40 achieves steering control matching the steering state.

The reaction force motor control unit 70 controls the drive circuit 34 on the basis of: a steered-side target steering angle θht* provided from the steering motor control unit 40; the steered angle δ which is detected by the steered angle sensor 17; an output signal from the rotational angle sensor 22; and a current detected by the current detection unit 35. Consequently, the reaction force motor control unit 70 achieves reaction force control matching the steering state.

Figure 3:
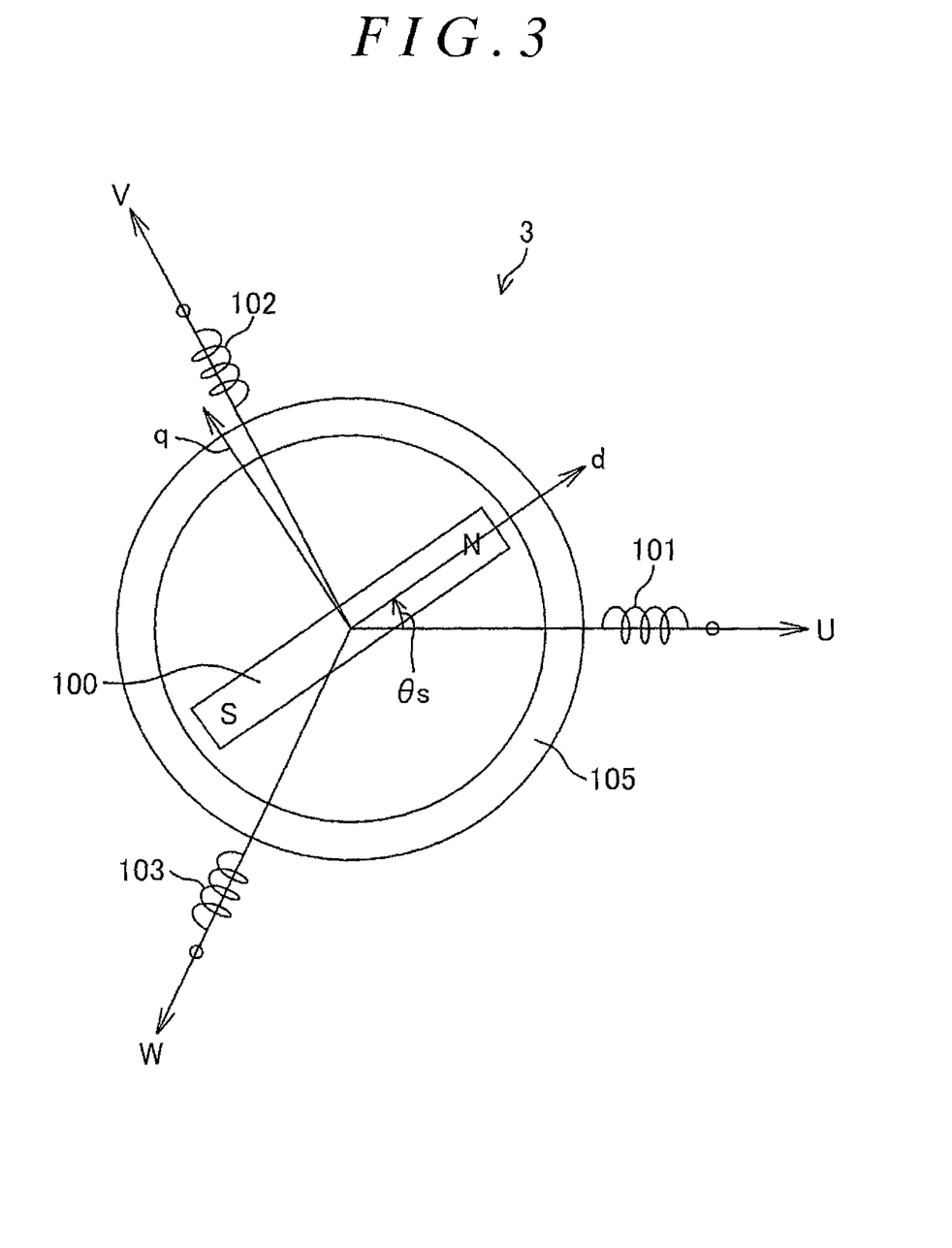
FIG. 3 illustrates the configuration of a steering motor.

The steering motor 3 may be a three-phase brushless motor, for example. As illustrated in FIG. 3, the steering motor 3 includes a rotor 100 that serves as a field, and a stator 105 that includes stator windings 101, 102, and 103 for U-phase, V-phase, and W-phase, respectively. The steering motor 3 may be of an inner rotor type in which the stator is disposed outside the rotor so as to face the rotor, or may be of an outer rotor type in which the stator is disposed inside the rotor, which is tubular, so as to face the rotor.

A three-phase fixed coordinate system (UVW coordinate system) in which the U-axis, the V-axis, and the W-axis extend in the directions of the stator windings 101, 102, and 103, respectively, for the respective phases is defined. In addition, a two-phase rotating coordinate system (dq coordinate system; actual rotating coordinate system) in which the d-axis (magnetic pole axis) extends in the direction of the magnetic pole of the rotor 100 and the q-axis (torque axis) extends in the direction which is perpendicular to the d-axis in the plane of rotation of the rotor 100 is defined. The dq coordinate system is a rotating coordinate system that rotates together with the rotor 100. In the dq coordinate system, only the q-axis current contributes to torque generation by the rotor 100. Thus, the d-axis current may be set to zero, and the q-axis current may be controlled in accordance with desired torque. A rotational angle (rotor angle (electrical angle)) $\theta_S$ of the rotor 100 is the rotational angle of the d-axis with respect to the U-axis. The dq coordinate system is the actual rotating coordinate system based on the rotor angle $\theta_S$. A coordinate conversion can be performed between the UVW coordinate system and the dq coordinate system using the rotor angle $\theta_S$.

The reaction force motor 19 is constituted of a three-phase brushless motor, for example, and has a structure that is similar to that of the steering motor 3.

Figure 4:
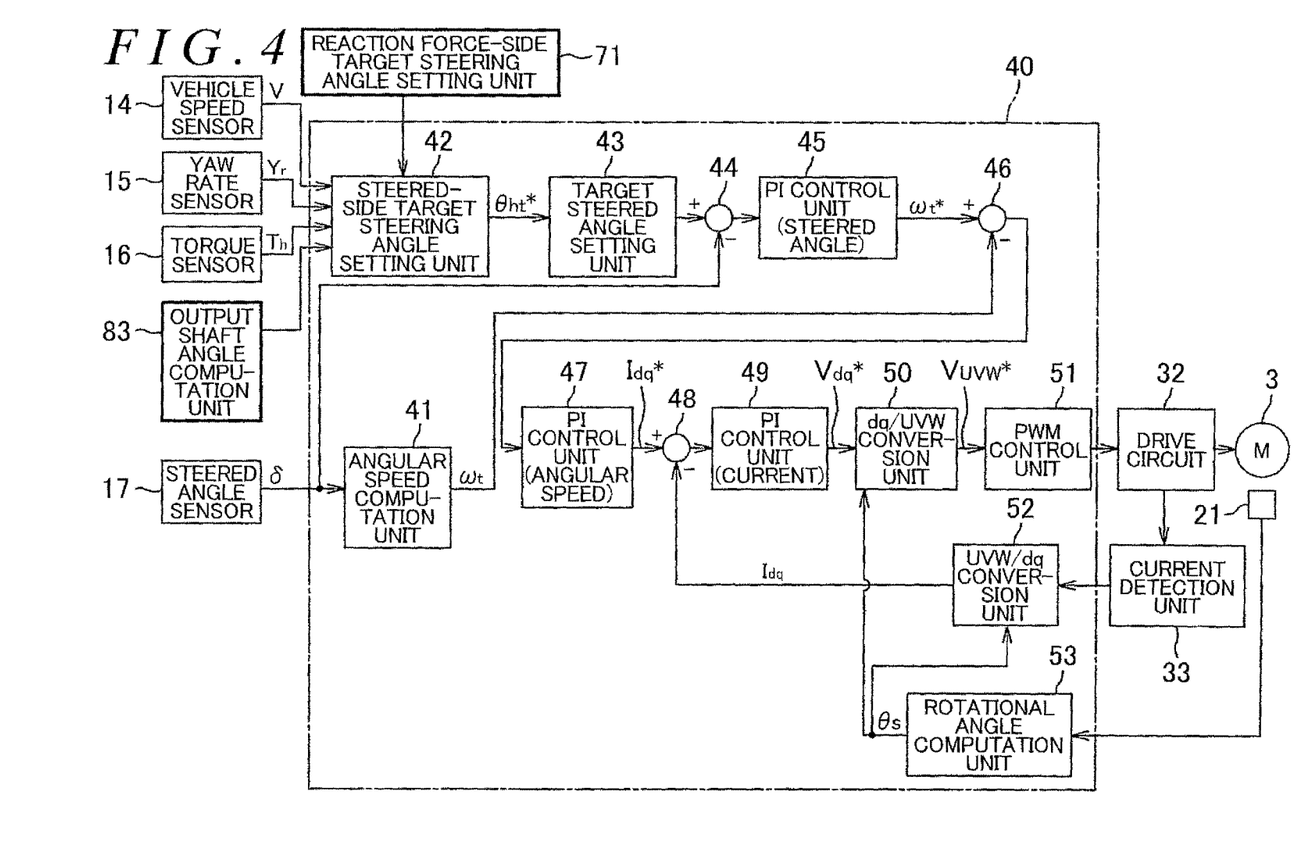
FIG. 4 is a block diagram illustrating an example of the configuration of a steering motor control unit.

FIG. 4 is a block diagram illustrating an example of the configuration of the steering motor control unit 40.

The steering motor control unit 40 includes an angular speed computation unit 41, a steered-side target steering angle setting unit 42, a target steered angle setting unit 43, an angle deviation computation unit 44, a proportional-integral (PI) control unit 45, an angular speed deviation computation unit 46, a PI control unit 47, a current deviation computation unit 48, a PI control unit 49, a dq/UVW conversion unit 50, a pulse width modulation (PWM) control unit 51, a UVW/dq conversion unit 52, and a rotational angle computation unit 53.

The steered-side target steering angle setting unit 42 computes a steered-side target steering angle $\theta ht^*$, which is a target value for the rotational angle (steering angle) of the steering wheel 2, on the basis of the output shaft angle $\theta h$ (the rotational angle of the output shaft 12) which is computed by an output shaft angle computation unit 83 (see FIG. 5) of the reaction force motor control unit 70, the vehicle speed V which is detected by the vehicle speed sensor 14, the steering torque Th which is detected by the torque sensor 16, and the yaw rate Yr which is detected by the yaw rate sensor 15. That is, the steered-side target steering angle setting unit 42 sets the steered-side target steering angle $\theta ht^*$ on the basis of detection values that represent the steering state (steering state detection values).

The target steered angle setting unit 43 sets a target steered angle $\delta^*$, which is a target value for the steered angle, on the basis of the steered-side target steering angle $\theta ht^*$ which is set by the steered-side target steering angle setting unit 42. The target steered angle $\delta^*$, which is set by the target steered angle setting unit 43, is provided to the angle deviation computation unit 44. The angle deviation computation unit 44 computes a deviation $\Delta\delta$ (=$\delta^*-\delta$) between the target steered angle $\delta^*$ which is set by the target steered angle setting unit 43 and the steered angle $\delta$ which is detected by the steered angle sensor 17.

The PI control unit 45 computes a target steered angular speed $\omega_t$, which is a target value for the steered angular speed, by performing PI computation on the angle deviation 46 which is computed by the angle deviation computation unit 44. The target steered angular speed $\omega_t^*$, which is computed by the PI control unit 45, is provided to the angular speed deviation computation unit 46.

The angular speed computation unit 41 computes an angular speed (steered angular speed) $\omega_t$ of the steered angle $\delta$ by differentiating the steered angle $\delta$, which is detected by the steered angle sensor 17, with respect to time. The steered angular speed $\omega_t$, which is computed by the angular speed computation unit 41, is provided to the angular speed deviation computation unit 46.

The angular speed deviation computation unit 46 computes a deviation $\Delta\omega_t$ (=$\omega_t^*-\omega_t$) between the target steered angular speed $\omega_t^*$ which is computed by the PI control unit 45 and the steered angular speed $\omega_t$ which is computed by the angular speed computation unit 41.

The PI control unit 47 computes a target current, which is a target value for the current which should flow through the coordinate axes of the dq coordinate system, by performing PI computation on the angular speed deviation $\Delta\omega_t$ which is computed by the angular speed deviation computation unit 46. Specifically, the PI control unit 47 computes a target d-axis current $I_d^*$ and a target q-axis current $I_q^*$ (hereinafter referred to as "target two-phase currents $I_{dq}^*$" when referred to collectively). More specifically, the PI control unit 47 computes the target q-axis current $I_q^*$ as a significant value, and computes the target d-axis current $I_d^*$ as zero. The target two-phase currents $I_{dq}^*$, which are computed by the PI control unit 47, are provided to the current deviation computation unit 48.

The rotational angle computation unit 53 computes the rotational angle (electrical angle; hereinafter referred to as a "rotor angle $\theta_S$") of the rotor of the steering motor 3 on the basis of an output signal from the rotational angle sensor 21.

The current detection unit 33 detects a U-phase current $I_U$, a V-phase current $I_V$, and a W-phase current $I_W$ (hereinafter referred to as "three-phase detected currents $T_{UVW}$" when referred to collectively) of the steering motor 3. The three-phase detected currents $T_{UVW}$ which are detected by the current detection unit 33 are provided to the UVW/dq conversion unit 52.

The UVW/dq conversion unit 52 converts the three-phase detected currents $I_{UVW}$ (the U-phase current $I_U$, the V-phase current $I_V$, and the W-phase current $I_W$) in the UVW coordinate system which are detected by the current detection unit 33 into a d-axis detected current $I_d$ and a q-axis detected current $I_q$ (hereinafter referred to as "two-phase detected currents $I_{dq}$" when referred to collectively) in the dq coordinate system. Such currents are provided to the current deviation computation unit 48. The rotor angle $\theta_S$, which is computed by the rotational angle computation unit 53, is used in the coordinate conversion which is performed by the UVW/dq conversion unit 52.

The current deviation computation unit 48 computes a deviation between the target two-phase currents $I_{dq}^*$ which are computed by the PI control unit 47 and the two-phase detected currents $I_{dq}$ which are provided from the UVW/dq conversion unit 52. More specifically, the current deviation computation unit 48 computes a deviation of the d-axis detected current $I_d$ from the target d-axis current $I_d^*$ and a deviation of the q-axis detected current $I_q$ from the target q-axis current $I_q^*$. Such deviations are provided to the PI control unit 49.

The PI control unit 49 generates target two-phase voltages $V_{dq}^*$ (a target d-axis voltage $V_d^*$ and a target q-axis voltage $V_q^*$) to be applied to the steering motor 3 by performing PI computation on the current deviation which is computed by the current deviation computation unit 48. The target two-phase voltages $V_{dq}^*$ are provided to the dq/UVW conversion unit 50.

The dq/UVW conversion unit 50 converts the target two-phase voltages $V_{dq}^*$ into target three-phase voltages $V_{UVW}$. The rotor angle $\theta_S$, which is computed by the rotational angle computation unit 53, is used in the coordinate conversion. The target three-phase voltages $V_{UVW}$ are composed of a target U-phase voltage $V_U$, a target V-phase voltage $V_V^*$, and a target W-phase voltage $V_W^*$. The target three-phase voltage $V_{UVW}^*$ are provided to the PWM control unit 51.

The PWM control unit 51 generates a U-phase PWM control signal, a V-phase PWM control signal, and a W-phase PWM control signal with a duty corresponding to the target U-phase voltage $V_U^*$, the target V-phase voltage $V_V*$, and the target W-phase voltage $V_W*$, respectively, and supplies the PWM control signals to the drive circuit 32.

The drive circuit 32 is constituted of a three-phase inverter circuit corresponding to the U-phase, the V-phase, and the W-phase. Power elements that constitute the inverter circuit are controlled in accordance with the PWM control signals which are provided from the PWM control unit 51 so that voltages corresponding to the target three-phase voltages $V_{UVW}*$ are applied to the stator windings 101, 102, and 103 for the respective phases of the steering motor 3.

The angle deviation computation unit 44 and the PI control unit 45 constitute an angle feedback controller. The angle feedback controller operates to control the steered angle δ of the steered wheels 5 so as to approximate the target steered angle δ* which is set by the target steered angle setting unit 43. The angular speed deviation computation unit 46 and the PI control unit 47 constitute an angular speed feedback controller. The angular speed feedback controller operates to control the steered angular speed $\omega_t$ so as to approximate the target steered angular speed $\omega_t*$ which is computed by the PI control unit 45. The current deviation computation unit 48 and the PI control unit 49 constitute a current feedback controller. The current feedback controller operates to control the motor current which flows through the steering motor 3 so as to approximate the target two-phase currents $I_{dq}*$ which are computed by the PI control unit 47.

Figure 5:
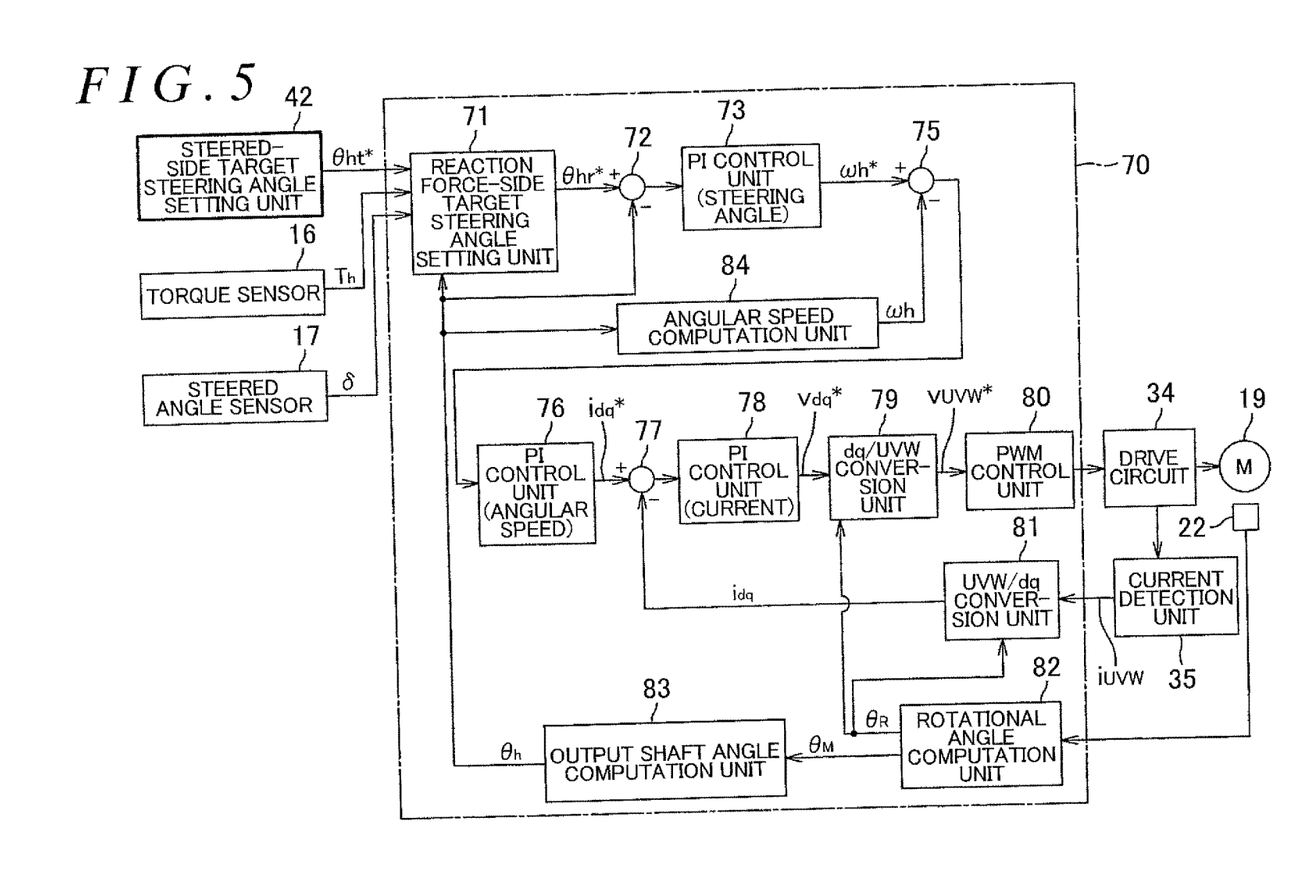
FIG. 5 is a block diagram illustrating an example of the configuration of a reaction force motor control unit.

FIG. 5 is a block diagram illustrating an example of the configuration of the reaction force motor control unit 70.

The reaction force motor control unit 70 includes a reaction force-side target steering angle setting unit 71, an angle deviation computation unit 72, a PI control unit 73, an angular speed deviation computation unit 75, a PI control unit 76, a current deviation computation unit 77, a PI control unit 78, a dq/UVW conversion unit 79, a PWM control unit 80, a UVW/dq conversion unit 81, a rotational angle computation unit 82, an output shaft angle computation unit 83, and an angular speed computation unit 84.

The reaction force-side target steering angle setting unit 71 sets a reaction force-side target steering angle θhr*, which is a target value for the rotational angle of the output shaft 12, on the basis of the steered-side target steering angle θht* which is set by the steered-side target steering angle setting unit 42 of the steering motor control unit 40, the steering torque Th which is detected by the torque sensor 16, and the steered angle δ which is detected by the steered angle sensor 17. The reaction force-side target steering angle setting unit 71 sets the steered-side target steering angle θht*, which is set by the steered-side target steering angle setting unit 42, as the reaction force-side target steering angle θhr* during normal times. Operation of the reaction force-side target steering angle setting unit 71 will be discussed in detail later.

The rotational angle computation unit 82 computes an electrical angle $\theta_R$ and a mechanical angle $\theta_M$ of the rotor of the reaction force motor 19 on the basis of an output signal from the rotational angle sensor 22. The output shaft angle computation unit 83 computes an output shaft angle θh by dividing the mechanical angle $\theta_M$ of the rotor of the reaction force motor 19 by the speed reduction ratio of the speed reducer 20. In the embodiment, the output shaft angle computation unit 83 computes the amount of rotation (rotational angle) of the output shaft 12 in both the forward and reverse directions from the neutral position (reference position) of the output shaft 12. The output shaft angle computation unit 83 outputs the amount of rotation to the right from the neutral position as a positive value, for example, and outputs the amount of rotation to the left from the neutral position as a negative value, for example.

The angle deviation computation unit 72 computes a deviation Δθh (=θhr*−θh) between the reaction force-side target steering angle θhr* which is set by the reaction force-side target steering angle setting unit 71 and the output shaft angle θh which is computed by the output shaft angle computation unit 83.

The PI control unit 73 computes a target output shaft angular speed $\omega_n*$, which is a target value for the output shaft angular speed, by performing PI computation on the angle deviation Δθh which is computed by the angle deviation computation unit 72. The target output shaft angular speed $\omega_n*$, which is computed by the PI control unit 73, is provided to the angular speed deviation computation unit 75.

The angular speed computation unit 84 computes an angular speed (output shaft angular speed) $\omega_n$ of the output shaft angle $\theta_n$ by differentiating the output shaft angle $\theta_n$, which is computed by the output shaft angle computation unit 83, with respect to time. The output shaft angular speed $\omega_h$, which is computed by the angular speed computation unit 84, is provided to the angular speed deviation computation unit 75.

The angular speed deviation computation unit 75 computes a deviation $\Delta\omega_h$ (=$\omega_h*−\omega_h$) between the target output shaft angular speed $\omega_n*$ which is computed by the PI control unit 73 and the output shaft angular speed $\omega_n$ which is computed by the angular speed computation unit 84.

The PI control unit 76 computes a target current, which is a target value for the current which should flow through the coordinate axes of the dq coordinate system, by performing PI computation on the angular speed deviation $\Delta\omega_h$ which is computed by the angular speed deviation computation unit 75. Specifically, the PI control unit 76 computes a target d-axis current $i_d*$ and a target q-axis current $i_q*$ (hereinafter referred to as "target two-phase currents $i_{dq}*$" when referred to collectively). More specifically, the PI control unit 76 computes the target q-axis current $i_q*$ as a significant value, and computes the target d-axis current $i_d*$ as zero. The target two-phase currents $i_{dq}*$, which are computed by the PI control unit 76, are provided to the current deviation computation unit 77.

The current detection unit 35 detects a U-phase current $i_U$, a V-phase current $i_V$, and a W-phase current $i_W$ (hereinafter referred to as "three-phase detected currents $i_{UVW}$" when referred to collectively) of the reaction force motor 19. The three-phase detected currents $i_{UVW}$ which are detected by the current detection unit 35 are provided to the UVW/dq conversion unit 81.

The UVW/dq conversion unit 81 converts the three-phase detected currents $i_{UVW}$ (the U-phase current $i_U$, the V-phase current $i_V$, and the W-phase current $i_W$) in the UVW coordinate system which are detected by the current detection unit 35 into a d-axis detected current $i_d$ and a q-axis detected current $i_q$ (hereinafter referred to as "two-phase detected currents $i_{dq}$" when referred to collectively) in the dq coordinate system. Such currents are provided to the current deviation computation unit 77. The electrical angle $\theta_R$, which is computed by the rotational angle computation unit 82, is used in the coordinate conversion which is performed by the UVW/dq conversion unit 81.

The current deviation computation unit 77 computes a deviation between the target two-phase currents $i_{dq}*$ which are output from the PI control unit 76 and the two-phase detected currents $i_{dq}$ which are provided from the UVW/dq conversion unit 81. More specifically, the current deviation computation unit 77 computes a deviation of the d-axis detected current $i_d$ from the target d-axis current $i_d^*$ and a deviation of the q-axis detected current $i_q$ from the target q-axis current $i_q^*$. Such deviations are provided to the PI control unit 78.

The PI control unit 78 generates target two-phase voltages $v_{dq}^*$ (a target d-axis voltage $v_d^*$ and a target q-axis voltage $v_q^*$) to be applied to the reaction force motor 19 by performing PI computation on the current deviation which is computed by the current deviation computation unit 77. The target two-phase voltages $v_{dq}^*$ are provided to the dq/UVW conversion unit 79.

The dq/UVW conversion unit 79 converts the target two-phase voltages $v_{dq}^*$ into target three-phase voltages $v_{UVW}^*$. The electrical angle θR, which is computed by the rotational angle computation unit 82, is used in the coordinate conversion. The target three-phase voltages $v_{UVW}^*$ are composed of a target U-phase voltage $v_U^*$, a target V-phase voltage $v_V^*$, and a target W-phase voltage $v_W^*$. The target three-phase voltages $v_{UVW}^*$ are provided to the PWM control unit 80.

The PWM control unit 80 generates a U-phase PWM control signal, a V-phase PWM control signal, and a W-phase PWM control signal with a duty corresponding to the target U-phase voltage $v_U^*$, the target V-phase voltage $v_V^*$, and the target W-phase voltage $v_W^*$, respectively, and supplies the PWM control signals to the drive circuit 34.

The drive circuit 34 is constituted of a three-phase inverter circuit corresponding to the U-phase, the V-phase, and the W-phase. Power elements that constitute the inverter circuit are controlled in accordance with the PWM control signals which are provided from the PWM control unit 80 so that voltages corresponding to the target three-phase voltages $v_{UVW}^*$ are applied to the stator windings for the respective phases of the reaction force motor 19.

The angle deviation computation unit 72 and the PI control unit 73 constitute an angle feedback controller. The angle feedback controller operates to control the output shaft angle θh so as to approximate the reaction force-side target steering angle θhr* which is set by the reaction force-side target steering angle setting unit 71. The angular speed deviation computation unit 75 and the PI control unit 76 constitute an angular speed feedback controller. The angular speed feedback controller operates to control the output shaft angular speed $ω_n$ so as to approximate the target output shaft angular speed $ω_n^*$ which is computed by the PI control unit 73. The current deviation computation unit 77 and the PI control unit 78 constitute a current feedback controller. The current feedback controller operates to control the motor current which flows through the reaction force motor 19 so as to approximate the target two-phase currents $I_{dq}^*$ which are output from the PI control unit 76.

Figure 6:
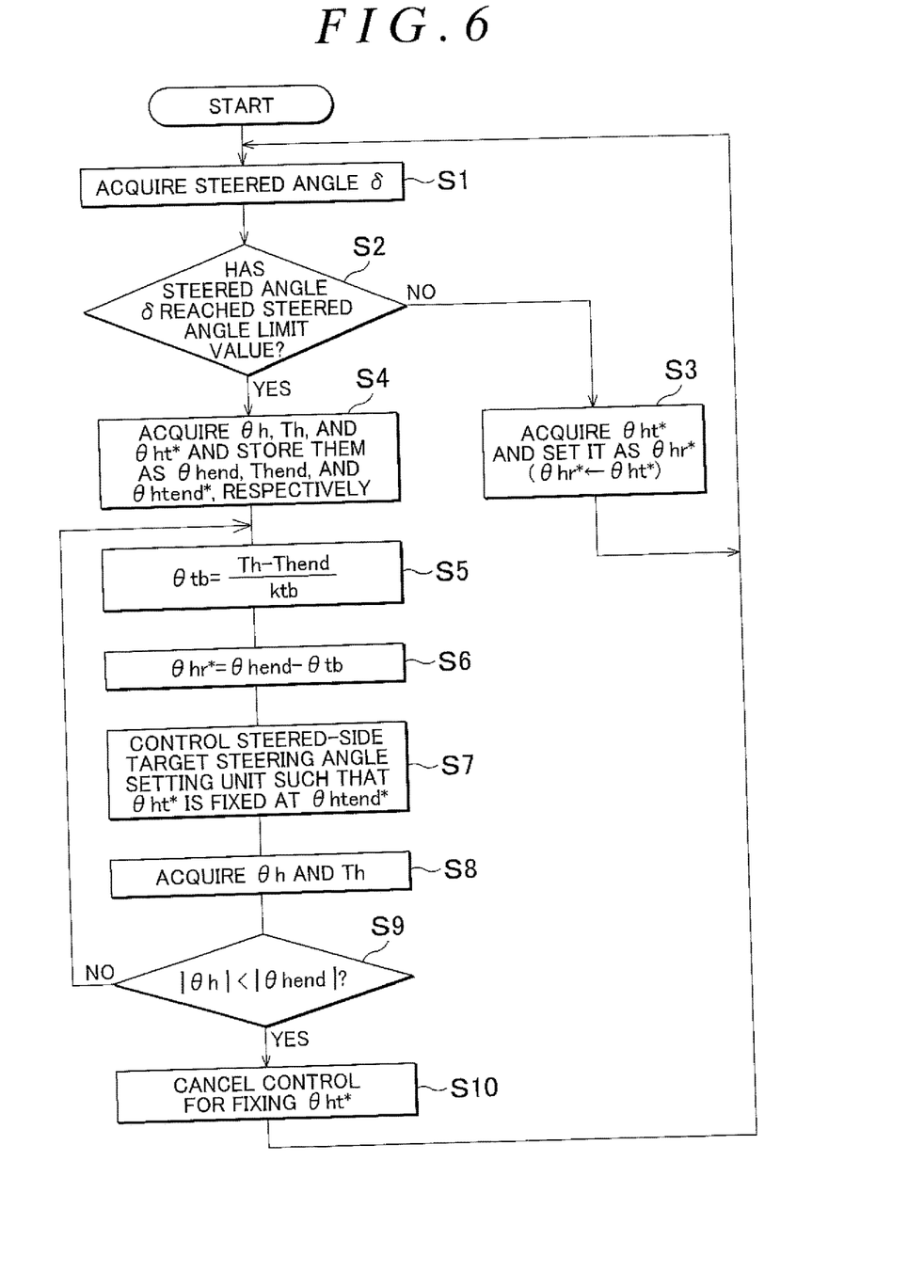
FIG. 6 is a flowchart illustrating operation of a reaction force-side target steering angle setting unit.

FIG. 6 is a flowchart illustrating operation of the reaction force-side target steering angle setting unit 71.

The reaction force-side target steering angle setting unit 71 acquires a steered angle δ detected by the steered angle sensor 17 (step S1). The reaction force-side target steering angle setting unit 71 determines whether or not the steered angle δ has reached a steered angle limit value (step S2). The steered angle limit value includes a limit value $δR_{end}$ ($δR_{end}$>0) in the right steering direction and a limit value $δL_{end}$ ($δL_{end}$<0) in the left steering direction. The reaction force-side target steering angle setting unit 71 determines that the steered angle limit value has been reached when the steered angle δ is equal to or more than $δR_{end}$ or when the steered angle δ is equal to or less than $δL_{end}$.

In the case where the steered angle δ has not reached the steered angle limit value (step S2: NO), the reaction force-side target steering angle setting unit 71 acquires a steered-side target steering angle θht* which is set by the steered-side target steering angle setting unit 42, and sets the steered-side target steering angle θht* as the reaction force-side target steering angle θhr* (step S3). In this case, the steered-side target steering angle θht* is provided, as it is, to the angle deviation computation unit 72 as the reaction force-side target steering angle θhr*. The reaction force-side target steering angle setting unit 71 returns to step S1.

In the case where it is determined in step S2 that the steered angle δ has reached the steered angle limit value (step S2: YES), the reaction force-side target steering angle setting unit 71 proceeds to step S4. In step S4, the reaction force-side target steering angle setting unit 71 acquires an output shaft angle θh which is computed by the output shaft angle computation unit 83, steering torque Th which is detected by the torque sensor 16, and a steered-side target steering angle θht* which is set by the steered-side target steering angle setting unit 42. The reaction force-side target steering angle setting unit 71 stores the output shaft angle θh, the steering torque Th, and the steered-side target steering angle θht*, which have been acquired, in a memory (not illustrated) as an output shaft angle $θh_{end}$, steering torque $Th_{end}$, and a steered-side target steering angle $θht^*_{end}$, respectively, at the steered angle limit value.

Next, the reaction force-side target steering angle setting unit 71 computes a torsional angle $θ_{tb}$ of the torsion bar 13 matching the steering torque Th on the basis of the following formula (1) (step S5).

$$θ_{tb}=(Th-Th_{end})/k_{tb} \quad (1)$$

In the formula (1), $Th_{end}$ is the steering torque at the steered angle limit value stored in the memory in step S4. $k_{tb}$ [N·mm/deg] is the spring constant of the torsion bar 13. Th is the steering torque. In the case where a transition has been made from step S4 to step S5, Th is the steering torque Th acquired in step S4. In the case where a transition has been made from step S9 to step S5 as discussed later, Th is the steering torque Th acquired in step S8.

Next, the reaction force-side target steering angle setting unit 71 computes a reaction force-side target steering angle θhr* on the basis of the following formula (2) (step S6). The computed reaction force-side target steering angle θhr* is provided to the angle deviation computation unit 72.

$$θhr^*=θh_{end}-θ_{tb} \quad (2)$$

In the formula (2), $θh_{end}$ is the output shaft angle at the steered angle limit value stored in the memory in step S4.

Next, the reaction force-side target steering angle setting unit 71 controls the steered-side target steering angle setting unit 42 such that the steered-side target steering angle θht is fixed at the steered-side target steering angle $θht_{end}$ at the steered angle limit value stored in the memory in step S4 (step S7).

After that, the reaction force-side target steering angle setting unit 71 acquires an output shaft angle θh which is computed by the output shaft angle computation unit 83 and steering torque Th which is detected by the torque sensor 16 (step S8).

The reaction force-side target steering angle setting unit 71 determines whether or not an absolute value |θh| of the output shaft angle θh is less than an absolute value $|θh_{end}|$ of the output shaft angle $θh_{end}$ at the steered angle limit value stored in the memory in step S4 (step S9). In the case where |θh| is not less than $|θh_{end}|$ (NO in step S9), the reaction force-side target steering angle setting unit 71 determines that a state in which the steered angle has reached the steered angle limit value is maintained, and returns to step S5. Consequently, the processes in steps S5 to S9 are executed again.

In the case where it is determined in step S9 that |θh| is less than |θ$_{end}$| (YES in step S9), the reaction force-side target steering angle setting unit 71 determines that the state in which the steered angle has reached the steered angle limit value has been canceled, and proceeds to step S10. In step S10, the reaction force-side target steering angle setting unit 71 cancels control for fixing the steered-side target steering angle θht at the steered-side target steering angle θht$_{end}$* at the steered angle limit value. The reaction force-side target steering angle setting unit 71 returns to step S1.

In the embodiment discussed earlier, when the steered angle δ reaches the steered angle limit value, the reaction force-side target steering angle setting unit 71 acquires an output shaft angle θh, steering torque Th and a steered-side target steering angle θht*. The reaction force-side target steering angle setting unit 71 stores the output shaft angle θh, the steering torque Th, and the steered-side target steering angle θht*, which have been acquired, in the memory as the output shaft angle θh$_{end}$, the steering torque Th$_{end}$, and the steered-side target steering angle θht*$_{end}$, respectively, at the steered angle limit value (see S2 and S4).

After that, the reaction force-side target steering angle setting unit 71 computes a torsional angle θ$_{tb}$ of the torsion bar 13 matching the steering torque Th on the basis of the formula (1) (see S5). In the case where a transition has been made from step S4 to step S5, θ$_{tb}$=0. If the steering wheel 2 has been operated additionally in the case where a transition has been made from step S9 to step S5, the torsional angle θ$_{tb}$ of the torsion bar 13 has a value other than zero. After that, the reaction force-side target steering angle setting unit 71 computes a reaction force-side target steering angle θhr* on the basis of the following formula (2) (see S6).

In the case where the torsional angle θ$_{tb}$ of the torsion bar 13 matching the steering torque Th is zero, such as in the case where a transition has been made from step S4 to step S5, the reaction force-side target steering angle θhr* is set to the output shaft angle θh$_{end}$ at the steered angle limit value.

In the case where the torsional angle θ$_{tb}$ of the torsion bar 13 matching the steering torque Th is a value other than zero, on the other hand, the reaction force-side target steering angle θhr* is set to a position on the side of the neutral position of the output shaft 12 with respect to the output shaft angle θ$_{end}$ at the steered angle limit value by an amount corresponding to an absolute value |θ$_{tb}$| of the torsional angle of the torsion bar 13 matching the steering torque Th. Consequently, rotation of the steering wheel 2 can be suppressed. The reason will be described.

If the steering wheel 2 is operated additionally even after the steered angle limit value is reached, the steering wheel 2 is urged to be rotated in the direction opposite to the side of the neutral position of the output shaft 12 with respect to the output shaft 12 by an amount corresponding to the absolute value |θ$_{tb}$| of the torsional angle of the torsion bar 13 matching the steering torque Th. When the reaction force-side target steering angle θhr* is set as discussed earlier, on the other hand, the output shaft 12 is urged to be rotated to a position close to the side of the neutral position of the output shaft 12 by an amount corresponding to the absolute value |θ$_{tb}$| of the torsional angle of the torsion bar 13 matching the steering torque Th. As a result, rotation of the steering wheel 2 can be suppressed.

While an embodiment of the present invention has been described above, the present invention may be implemented in other embodiments. For example, in the embodiment discussed earlier, the steered-side target steering angle setting unit 42 sets the steered-side target steering angle θht* on the basis of the vehicle speed V, the steering torque Th, the yaw rate Yr, and the output shaft angle θh. However, the steered-side target steering angle setting unit 42 may set the steered-side target steering angle θht* using at least the output shaft angle θh or the steering torque Th.

In the embodiment discussed earlier, the steered angle δ is detected by the steered angle sensor 17. However, the steered angle δ may be computed on the basis of an output signal from the rotational angle sensor 21 which detects the rotational angle of the steering motor 3.

In step S9 of FIG. 6, it is determined whether or not the absolute value |θh| of the output shaft angle θh is less than the absolute value |θh$_{end}$| of the output shaft angle θh$_{end}$ at the steered angle limit value. However, it may be determined whether or not the absolute value |Th| of the steering torque Th is less than the absolute value |Th$_{end}$| of the steering torque Th$_{end}$ at the steered angle limit value. In this case, the reaction force-side target steering angle setting unit 71 may proceed to step S10 when |Th| is less than |Th$_{end}$|.

In the embodiment discussed earlier, a mechanism that mechanically transfers operation torque applied to the steering wheel 2 to the steering operation mechanism 6 is not provided between the steering wheel 2 and the steering operation mechanism 6. However, a mechanism capable of switching between a coupled state and a non-coupled state, e.g. a clutch (an electromagnetic clutch), may be provided between the steering wheel 2 and the steering operation mechanism 6. For example, the steering operation mechanism 6 may be provided with a rack-and-pinion speed reduction mechanism, and a rotary shaft of the pinion and a rotary shaft of the steering wheel 2 may be removably coupled to each other by a clutch.

What is claimed is:

1. A vehicle steering device in which a steering operation mechanism configured to steer vehicle wheels is driven by a steering motor, the steering motor configured to be operated by a steering member during a steering operation, the steering operation mechanism not mechanically coupled to the steering member, the vehicle steering device comprising:
   an input shaft coupled to the steering member;
   a torsion bar, one end of which is coupled to the input shaft;
   an output shaft coupled to the other end of the torsion bar;
   a reaction force motor coupled to the output shaft to apply a reaction force to the steering member;
   a torque detector configured to detect steering torque applied to the steering member; and
   a reaction force motor controller configured to set a target rotational angle for the output shaft and control the reaction force motor such that a rotational angle of the output shaft is equal to the target rotational angle, the reaction force motor controller including a target rotational angle setter configured to set the target rotational angle for the output shaft at an angle opposite to a rotational angle of the steering member with respect to a neutral position of the output shaft, the target rotational angle being set upon a steered angle of the vehicle wheels reaching a steered angle limit value and a current steering torque applied to the steering member being larger than a steering torque previously applied to the steering member at the steered angle limit value, the neutral position of the output shaft corresponding to a rotational angle of the output shaft when the steered angle of the vehicle wheels has reached the steered angle limit value.

2. The vehicle steering device according to claim 1, further comprising:
- a steered angle detector configured to detect the steered angle of the vehicle wheels; and
- a rotational angle detector configured to detect the rotational angle of the output shaft, wherein the target rotational angle setter includes:
    - a first unit configured to store the rotational angle of the output shaft detected by the rotational angle detector as a first rotational angle, and store the steering torque detected by the torque detector as a first steering torque upon the detected steered angle reaching the steered angle limit value; and
    - a second unit configured to set the target rotational angle for the output shaft at an angle opposite of the first rotational angle with respect to close to the side of the neutral position and with respect to the steering torque detected by the torque detector and the first steering torque upon the rotational angle of the output shaft detected by the rotational angle detector being greater than or equal to the first rotational angle.

3. The vehicle steering device according to claim 2, further comprising:
- a steering motor controller configured to set a target steered angle for the vehicle wheels and control the steering motor such that the steered angle of the vehicle wheels is equal to the target steered angle,
- wherein the second unit includes a unit configured to fix the target steered angle upon the detected rotational angle of the output shaft being greater than or equal to the first rotational angle.

* * * * *